United States Patent
Teng et al.

(10) Patent No.: US 10,594,634 B1
(45) Date of Patent: Mar. 17, 2020

(54) ELECTRONIC MAIL GENERATION DEVICE AND METHOD OF USE

(71) Applicants: Soo Chuan Teng, Houston, TX (US); Chad Nguyen, Houston, TX (US)

(72) Inventors: Soo Chuan Teng, Houston, TX (US); Chad Nguyen, Houston, TX (US)

(*) Notice: Subject to any disclaimer, the term of this patent is extended or adjusted under 35 U.S.C. 154(b) by 0 days.

(21) Appl. No.: 16/210,658

(22) Filed: Dec. 5, 2018

(51) Int. Cl.
| | |
|---|---|
| *H04L 12/58* | (2006.01) |
| *H04N 1/00* | (2006.01) |
| *G06K 19/06* | (2006.01) |
| *G06F 16/25* | (2019.01) |
| *G06F 3/12* | (2006.01) |

(52) U.S. Cl.
CPC ............ *H04L 51/02* (2013.01); *G06F 3/1208* (2013.01); *G06F 3/1256* (2013.01); *G06F 16/252* (2019.01); *G06K 19/06037* (2013.01); *H04N 1/0044* (2013.01); *H04N 1/00161* (2013.01); *G06F 3/1287* (2013.01)

(58) Field of Classification Search
CPC ............... H04L 51/02; H04N 1/00188; H04N 1/00122; H04N 1/00161; H04N 1/00312; G06F 9/453; G06Q 10/10; G06Q 20/32; G06N 20/10
USPC ............................................ 358/1.11–1.18
See application file for complete search history.

(56) References Cited

U.S. PATENT DOCUMENTS

| | | | |
|---|---|---|---|
| 5,036,472 A * | 7/1991 | Buckley | .............. G07F 17/26 347/110 |
| H001708 H * | 2/1998 | Davidson | ................. 235/381 |
| 6,446,115 B2 | 9/2002 | Powers | |
| 7,370,076 B2 | 5/2008 | Friedman | |
| 7,890,876 B1 | 2/2011 | Mandelbaum | |
| 8,091,031 B2 | 1/2012 | Evans | |
| 8,738,739 B2 | 5/2014 | Makar | |
| 9,037,516 B2 | 5/2015 | Abhyanker | |
| 9,697,529 B2 | 7/2017 | Fischer | |
| 9,912,810 B2 | 3/2018 | Segre | |
| 9,973,457 B2 | 5/2018 | Cauchois | |
| 10,013,980 B2 | 7/2018 | Borsutsky | |
| 10,068,284 B1 | 9/2018 | Zisk | |
| 10,116,596 B2 | 10/2018 | Li | |
| 2002/0036990 A1 | 3/2002 | Chodor | |
| 2004/0158488 A1 * | 8/2004 | Johnson | ............. G06Q 30/02 705/14.58 |
| 2005/0193334 A1 | 9/2005 | Ohashi | |
| 2007/0061224 A1 | 3/2007 | Hofmann | |
| 2007/0179664 A1 | 8/2007 | Welch | |
| 2007/0219712 A1 | 9/2007 | Abhyanker | |
| 2011/0106596 A1 | 5/2011 | Cosgrove | |
| 2012/0095835 A1 | 4/2012 | Makar | |
| 2013/0036635 A1 * | 2/2013 | Mayer | .................. G09F 9/30 40/124.06 |

(Continued)

FOREIGN PATENT DOCUMENTS

| | | |
|---|---|---|
| WO | 2012112886 | 8/2012 |
| WO | 2018063758 | 4/2018 |
| WO | 2018118946 | 6/2018 |

*Primary Examiner* — Chad Dickerson
(74) *Attorney, Agent, or Firm* — Ira Domnitz; Kelly Stephens

(57) ABSTRACT

Systems for sending postcards and other mail items from an electronic device such as an electronic phone, software applications for preparing and sending such items, and methods using a chatbot.

18 Claims, 3 Drawing Sheets

(56) References Cited

U.S. PATENT DOCUMENTS

| | | | |
|---|---|---|---|
| 2013/0077129 A1* | 3/2013 | Soh | G06K 15/02 |
| | | | 358/1.15 |
| 2013/0331060 A1 | 12/2013 | Brooks | |
| 2014/0122407 A1 | 5/2014 | Duan | |
| 2014/0164296 A1 | 6/2014 | Duan | |
| 2014/0237395 A1* | 8/2014 | Ogilvie | G06F 17/243 |
| | | | 715/760 |
| 2014/0279050 A1 | 9/2014 | Makar | |
| 2015/0039709 A1* | 2/2015 | Jacobs | H04L 51/10 |
| | | | 709/206 |
| 2015/0172505 A1* | 6/2015 | Park | H04N 1/00307 |
| | | | 358/1.15 |
| 2016/0191743 A1* | 6/2016 | Kiani | G06F 16/955 |
| | | | 358/3.28 |
| 2017/0140563 A1* | 5/2017 | No | G06F 3/0482 |
| 2019/0258431 A1* | 8/2019 | Yamamoto | G06F 3/1288 |

* cited by examiner

ELECTRONIC MAIL GENERATION DEVICE AND METHOD OF USE

CROSS-REFERENCE TO RELATED APPLICATIONS

Not applicable.

STATEMENT REGARDING FEDERALLY SPONSORED RESEARCH

Not applicable.

BACKGROUND

There exists a need to provide a way to get in touch with people and to send postcards and gifts more conveniently through an electronic medium. During the holiday seasons this is especially true. Some technology currently exists which requires a user to download an application and spend excessive time answering irrelevant questions.

The present invention is distinguished from the following prior art pieces in many ways.

U.S. Pat. No. 9,037,516—This patent is for direct mailing in a geo spatial environment using a wide variety of metrics to determine what to be displayed on the mailer. This patent utilizes a set of algorithms that will present the relevant user information on the mailer. The present invention does not utilize metrics to determine a mailer display.

U.S. Pat. No. 6,446,115—This is a patent for generating business letters using e-mail services. The present invention does not use e-mail services to generate business letters.

U.S. Pat. No. 7,370,076—This patent is for a fulfillment system that can add a gift card to a personalized greeting card. This patent discloses a gift card tucked into a greeting card. The present invention does not address gift cards tucked into greeting cards.

U.S. Pat. No. 7,890,876—This patent is for displaying graphical contents based on the keywords the user typed in. For example, typing keywords "I love to golf", the system will then display a picture of golf. The present invention does not display graphical content based on keywords.

U.S. Pat. No. 8,091,031—This patent is for a computerized method in creating advertisements and advertisements only. The present invention does not address methods in creating advertisements.

U.S. Pat. No. 10,013,980—This patent is for a menu based selection response for a chatbot; user can select a response and chatbot will respond with a menu that includes a list of subsequent actions the user can perform. The present invention does not use menu of selections provided by a chatbot.

U.S. Pat. No. 10,068,284—This patent provides a Graphical User Interface, or a shopping cart link along with the picture to the user, and after the user replies to the chatbot with the number which corresponds with the item, the user can then purchase the item. The present invention does not utilize a GUI interface for purchase of items.

U.S. Pat. No. 10,116,596—This patent is for a method in which a chatbot is utilized to perform a task such as customer service but with multiple recipients. The key distinction between this patent and the present invention is the ability to invite people into the same chat to resolve a problem with a chatbot, in this patent.

U.S. Pat. No. 9,697,529—This patent is for a very complex method of gathering previous information from users such as their credit score, transactions etc. for the merchant so that the chatbot can tailor-make a custom marketing offer for them. The present invention does not gather information for a custom marketing offer.

U.S. Pat. No. 9,912,810—The purpose of this patent is to replace human agents in customer service or sales field. It includes automation for questions and answers for help desk, delivery, customer service, telemarketing, emergency response, etc. The present invention is not designed to replace human agents in customer service.

U.S. Pat. No. 9,973,457—This patent concerns use of a live chat system with the initial conversation being a chatbot related Q &A and then if needed, will be directed to a virtual agent (human). The present invention does not use live chat with chatbots.

US 2004/0158488—This patent is specifically for realtors, a way for them to advertise and sell real estate by going online and inputting the picture of the house, realtor's photo and any relevant info. The present invention does not use advertisements to sell real estate.

US 2005/193334—This patent discloses a method of layout and storage system. The present invention is not a layout and storage system.

US 2007/0061224—This patent addresses a method of automatic ordering and performing services. The present invention does not focus on automatic ordering and performing services.

US 2007/0179664—This patent is for a method of using a mail piece inserter to produce mass mailers including the fabrication of the mails and the processing of it. The present invention does not address the fabrication of mails and the processing of it.

US 2007/0219712—This patent addresses a method for geo-spatial/real property management. In this patent a user can upload their information online, pay rent, pre-qualifying prospects based on their income, etc. The present invention does not focus on geo-spatial real property management.

US 2002/0036990—This patent addresses a method for capturing a picture and distributing it on a WAN (wide area network). The present invention does not relate to capturing pictures and distributing on a WAN.

US 2012/0095835—This patent focuses on an automatic chatbot designed to ascertain why a customer declined a sales transaction. The present invention does not address the declination of sales transaction.

US 2014/0122407—This patent focuses on a web page/merchant web site. The chatbot is designed to interact with the users and provide intelligent response. The present invention is not designed as a web page/merchant web page.

US 2014/0164296—This patent is a continuation of US 20140122407. The present invention is not designed as a web page/merchant web page.

US 2011/0106596—This patent addresses a method of sending mailers out for free, only charging postage and through a discount postage rate to make money. This patent doesn't disclose the use of a chatbot or text, unlike the present invention.

WO 2018/063758—This patent discloses how a chatbot functions, focusing on an intelligent chatbot that can capture a human's emotions and can remember the state of emotions. The present invention does not address focusing on human emotions.

WO 2018/118946—This discloses a personalized direct mail system targeted for printing advertisements to users. As disclosed, this patent discloses a machine that learns based on buyer's keywords and searches to tailor-make ads to them. The present invention does not focus on advertisements.

US 2014/0279050—This patent focuses on affiliates for web retailers in a web application window, for the purpose of sending advertisements. The present invention does not focus on sending advertisements.

WO2012112886—This patent application is distinguished from the present invention because this patent application discloses the use of an actual application and it does not disclose the use of a chatbot or any texting method to send out a card.

SUMMARY

The present invention is a new and novel design for online generation of physical postcards and/or gifts.

In several embodiments, this invention provides various systems for sending postcards from a mobile device, or electronic device, such as a mobile phone, tablet, laptop, desktop computer, or smart watch that can send/receive SMS or MMS text and binary objects such as electronic pictures. In some embodiments, the present invention uses a mobile device for sending mail items as well as utilizing methods for simplifying the sending of postcards.

In several embodiments, the present invention is distinguished from competitors as competitors: 1) need a user to download an application, 2) do not send out reminders for users for key dates, 3) are lost in the myriad number of apps available to a user, and 4) target only seasonal holidays.

In several embodiments, the present invention expedites and increases the accuracy for sending and preparing cards through the use of an electronic medium. In several embodiments of the invention, the easiest way to obtain information from a user is through texts rather than forcing a user to download an application.

In several embodiments, a chatbot, or other electronic interactive media, can receive, process, and send information through texts that can instruct a user on a simplified process for preparation of a postcard, letter or gift to be sent to a third party. In some embodiments, pictures, addresses, information and other materials are already stored with a chatbot, which are then written on a postcard and sent to a third party via real world postal delivery.

In some embodiments, pictures, addresses, information and other materials are already stored with a backend database that is accessible by a chatbot, which are then written on a postcard and sent to a third party via real world postal delivery. In several embodiments, the present invention cuts down the number of steps to have a postcard generated over prior art.

Certain embodiments of the present invention provide, for example, equipment, apparatuses, software, and methods that allow people to send postcards more easily, to manage contact information including mailing addresses more efficiently, to send postcards with pictures that are more personal or that contain images that are more specifically meaningful to the sender and recipient of the postcard, or a combination thereof.

Some embodiments of the invention include various systems for sending mail items or postcards from electronic devices. Such systems may include, but are not limited to, a software application running on multiple mobile devices, such as mobile phones, a chatbot that operates on different texting or messaging platforms, (e.g. SMS text, Facebook messenger, Instagram, WhatsApp, Line, WeChat, Telegram etc.), at least one printing and mailing facility, and at least one billing module.

In a number of embodiments, the mobile devices, the printing and mailing facility, and the billing module are in communication through at least one network. Some embodiments of the present invention include various software applications for an electronic device for sending a mail item or for preparing and sending a postcard.

Various different embodiments of the invention may include a user interface component that provides for selection by the user to send the mail item or prepare and send the postcard, an image selection component (e.g., for postcard embodiments) that provides for user selection of a picture for the postcard, and a message input component that provides for the user to enter a personal message for the mail item or postcard.

Some embodiments of the present invention include a recipient selection component that provides for the user to select a recipient for the mail item or postcard from an address book database.

Some embodiments may include a payment component that obtains authorization from the user for payment for sending the mail item or postcard, and a communication component that automatically sends the picture (e.g., for postcard embodiments), the personal message, and the mailing address to at least one printing and mailing facility via at least one network, for instance, for printing the postcard and mailing to the recipient.

Some embodiments further include a holding component that stores the picture (e.g., in postcard embodiments), the personal message, and identification of the recipient. In certain embodiments, the holding component automatically instructs the communication component to send the picture, the personal message, and the mailing address to at least one printing and mailing facility for printing and mailing to the recipient when the mailing address obtaining component obtains the mailing address from the recipient.

In some embodiments, the mailing address obtaining component automatically updates the address book for the recipient on the electronic device running the software application by adding the mailing address when the mailing address obtaining component obtains the mailing address from the recipient.

In some embodiments, the image selection component of the invention provides for the user to select a picture taken by the electronic device to the software application/chatbot, to select a picture from a picture gallery stored on the electronic device to the software application/chatbot, or both. In some embodiments, the image selection component provides for the user to crop a picture, for example, for the postcard.

In some embodiments, users will receive a short message service ("SMS") text reminders a week or two prior to the event dates set forth by them for their selected recipients, and users can simply reply to the text to create a card or send a gift. In some embodiments, users can either set the event reminders on the website, chatbot, or an actual app. In either option, they will get notified either in a SMS text form, or a call. It is envisioned that in some embodiments, a user may preset what they want to send out for those events, preset cards and gifts.

In several embodiments of the present invention, the present invention can be applied to letters, "thank you" notes, greeting cards, announcements, congratulations, invitations and/or gifts. In several embodiments, language prompts will be in a variety of languages, not just English. In several embodiments, fonts can be customized or even involve a personal signature. In several embodiments, it is envisioned that several platforms can be utilized, which include, but are not limited to, Text, Facebook messenger, WhatsApp, Line, WeChat, LinkedIn, Telegram, etc., or even voice to speech platforms.

In certain embodiments, there is a social platform for addresses within the backend database. For example, if a user has an account with us, if a person wants to send a card to that user, all I need is to look that user up within the backend database and set up that user as a recipient.

In certain embodiments of the present invention, the invention will incorporate quick response codes ("QR codes") on the card. Upon scanning them, within the application or virtual reality ("VR") headset, the recipient can then view the content. The content might be a song, a video, or a mixture of both. At some point they will need to input a password to unlock the content for privacy. The video and sound content may be made either public or private in which a password is generated and made available to the sender or recipient via text, mail, email, or phone call. The password would then be used to unlock the video/audio by the recipient.

In several embodiments, the invention can be used to integrate with business to business applications. In several embodiments, the invention can be integrating with various CRM ("Customer Relationship Management") software tools or POS (Point of Sale) systems. In some embodiments, once the client notes an upcoming birthday or their purchase anniversaries are up, they will be automatically sent a happy birthday or reminder card, and even gifts. In some embodiments, a business can establish a wish list from their top clients, the business can select a budget, and the gifts will be mailed out to their clients.

In some embodiments, the chatbot can be sold as a package for integrating it with the business customer's current website. In some embodiments, the present invention utilizes a website (sign up)—chatbot (card creation)—(application program interface ("API") synched with a printing company) Printing company—Actual mail. In some embodiments, the present invention utilizes a text to a number (chatbot)—sign up through chatbot—creating a card through chatbot-data sent to printing company automatically—cards get printed and shipped—recipients receive actual card.

In several embodiments, the present invention addresses the fast paced and impersonal nature of greeting cards and messages. In several embodiments, the present invention addresses the issues of providing sensitivity, sincerity and thoughtfulness for greeting cards and gifts. In some embodiments, there is a version of the invention that provides reminders and calendars key events and dates. In some embodiments, the present invention makes "gifting" easier for the user. In some embodiments, the present invention addresses the desire of an end recipient to receive a personal "paper" card.

In some embodiments, the present invention uses a twenty-four hour, seven days a week chatbot that will interact with users via text, capture key words and gift instruction, and then mail out cards or gifts for the user. In some embodiments, the present invention can be utilized on a desktop or laptop computer. In some embodiments, the present invention includes a review or screening process for inappropriate content.

BRIEF DESCRIPTION OF THE DRAWING

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
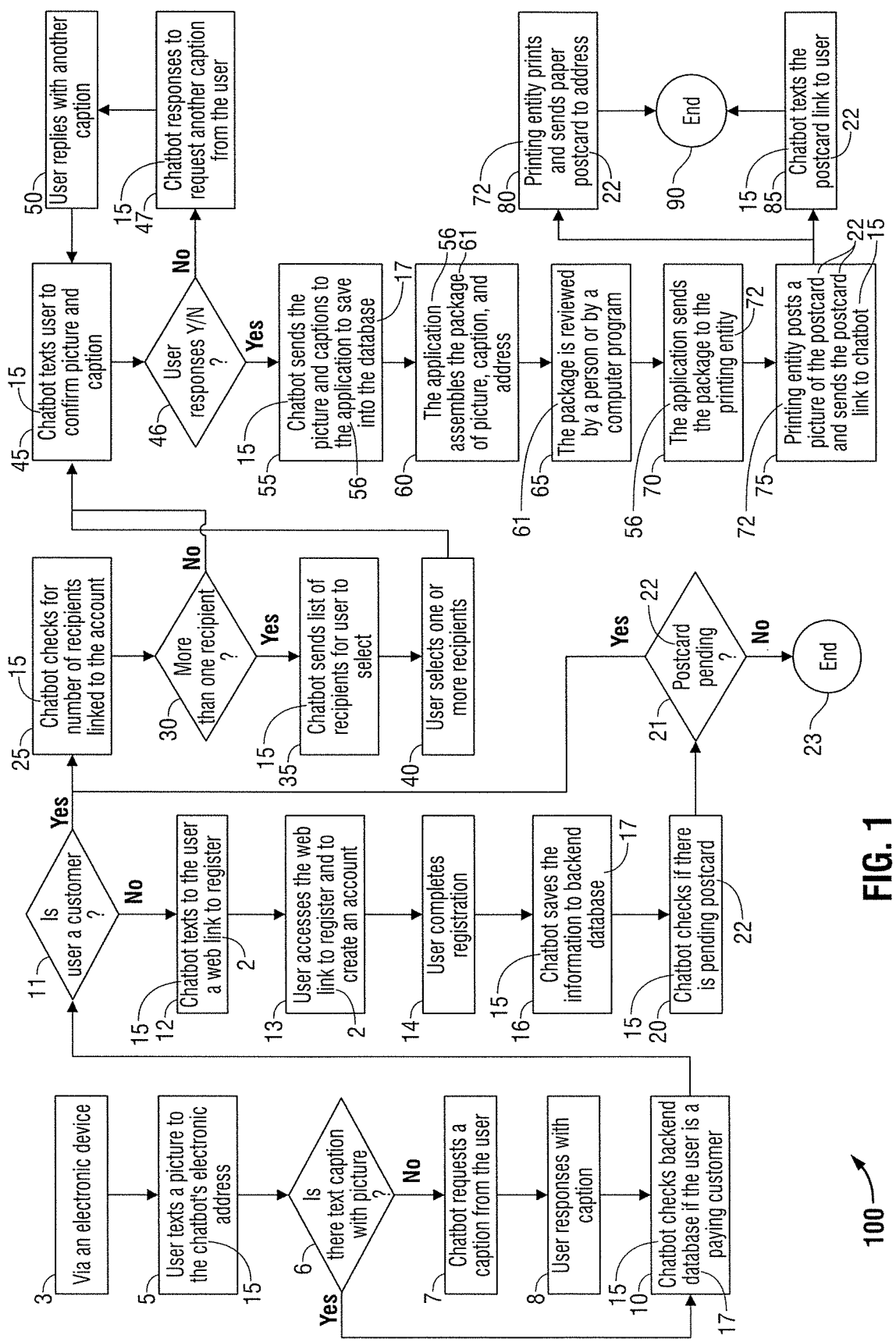
FIG. 1 is a flow chart showing the process for one embodiment of the present invention.

One or more illustrative embodiments, incorporating the invention disclosed herein, are presented below. Applicant has created a revolutionary and novel system and method for preparing postcards and other mailing items.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations, and the like, have been omitted inasmuch as such details are not necessary to obtain a complete understanding of the present disclosure and are within the knowledge of persons of ordinary skill in the relevant art.

Referring to the drawings in general, it will be understood that the illustrations are for the purpose of describing particular embodiments of the disclosure and are not intended to be limiting thereto. Drawings are not necessarily to scale, and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless, or essentially meaningless, the definition should be taken from Webster's Dictionary, 11th Edition, 2016. Definitions, and/or interpretations, should not be incorporated from other patent applications, patents, or publications, related or not, unless specifically stated in this specification or if the incorporation is necessary for maintaining validity. Specifically defined terms: As utilized herein, "chatbot" includes, but is not limited to a computer program designed to simulate conversation with human users, especially over the Internet. As utilized herein, "postcard" includes, but is not limited to, a card for sending a message by mail without an envelope, typically having a photograph or other illustration on one side, however, in some embodiments of the present invention "postcard" can include other materials to be mailed such as notes and letters. As utilized herein, "activation code" includes, but is not limited to, any code or data input that is capable of making something active or operative. As utilized herein, "user" includes, but is not limited to, a person, business or entity capable of using and sending electronic data.

Certain terms are used in the following description and claims to refer to particular system components. As one skilled in the art will appreciate, different persons may refer to a component by different names. This document does not intend to distinguish between components that differ in name, but not function. The drawing figures are not necessarily to scale. Certain features of the invention may be shown exaggerated in scale, or in somewhat schematic form, and some details of conventional elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

FIG. 1 is a flow chart of one embodiment of the present invention. As shown, FIG. 1 is one embodiment of user flow process 100. In several embodiments, a user can text, or send a picture 5, or other materials, to a chatbot's 15 electronic address through use of an electronic device 3. The electronic device 3 can be of any type known in the industry for use in sending electronic signals.

In several embodiments, chatbot 15 operates on different texting or messaging platforms, (e.g. SMS text, Facebook messenger, Instagram, WhatsApp, Line, WeChat, Telegram etc.). In several embodiments, language prompts will be in a variety of languages, not just English. In several embodiments, fonts can be customized or even involve a personal signature. In several embodiments, it is envisioned that several platforms can be utilized, which include, but are not limited to Text, Facebook messenger, WhatsApp, Line, WeChat, LinkedIn, Telegram, etc., or even voice to speech platforms.

In some embodiments, the chatbot 15 can be sold as a package for integration into a user's website. In some embodiments, the present invention utilizes a website (sign up)—chatbot (card creation)—(API synched with the Printing company) Printing company—actual mail system. In some embodiments, the present invention utilizes a text to a number (chatbot)—sign up through chatbot 15—create card through chatbot—data sent to printing company automatically-cards get printed and shipped—recipients receive actual card system.

In some embodiments, the present invention uses a twenty-four hour, seven days a week chatbot 15 that will interact with users via text, capture key words and gift instruction, and then mail out cards or gifts for the user.

In several embodiments, the chatbot 15 will ascertain if there is a text caption with the picture 6, or other material. If there is no picture or other material, then the chatbot 15 will request a caption from the user 7.

If the user responds with a caption 8 then the chatbot 15 checks on the backend database 17 to see if the user is a paying customer 10. Backend database 17 is a digital storage medium capable of storing data. If there is text caption with the picture 6 then the chatbot 15 checks on the backend database 17 to see if the user is a paying customer 10.

In several embodiments, the chatbot 15 will verify that a user is a customer 10. If the answer is "no" 11, then the chatbot 15 will text to the user a web link to register or sign user up via text in various messaging platforms 12.

In several embodiments, the user can then access a web link 2 to register and to create an account 13. The user can then complete registration 14. In many embodiments, the chatbot 15 then saves 16 the information to the backend database 17. In several embodiments, the chatbot 15 will then check to see if there is a pending postcard 20. In several embodiments, if there is no postcard 22 pending 21, then the chatbot 15 will end the session. If there is a postcard 22 pending, then the chatbot 15 will check the number of recipients linked to the account 25. In many embodiments, if the user is a customer 11, then the chatbot 15 will check the number of recipients linked to the account 25.

In some embodiments, the chatbot 15 will review to see if there is more than one recipient 30. In some embodiments, the chatbot 15 then sends a list of recipients for the user to select from 35. The user then selects one or more recipients 40 and the chatbot 15 can text a user to confirm a picture or caption 45. In several embodiments, if there are not more than one recipient 30 then the chatbot 15 can text a user to confirm a picture or caption 45.

In some embodiments, the user can respond 46 if the picture and caption are acceptable. If the response is "no", then the chatbot 15 responds to the request asking for another caption from the user 47. The user can then reply with another caption or picture 50. The chatbot 15 can then text a user to confirm a picture or caption 45 again.

In several embodiments, if the response 46 is "yes", then the chatbot 15 sends the picture and caption to the application 56 to save 55 into the backend database 17. In some embodiments, the application 56 assembles the package 61 of picture, caption, and address 60. In some embodiments, the package 61 is then reviewed for content by a computer program 65. In some embodiments, this review is designed to filter out pornographic content.

In several embodiments, the application 56 then sends 70 the package 61 to a printing entity 72. In several embodiments, printing entity 72 posts a picture of the postcard 22 and sends 75 the postcard link to chatbot 15. In some embodiments, the printing entity 72 then prints and sends the paper postcard 22 to an address 80 and the process is ended 90. In some embodiments, the chatbot 15 will also text the postcard 22 link to a user 85 and the process is ended 90. In some embodiments, the printing entity 72 can be at the same location as the chatbot 15 or remote from the chatbot 15.

In several embodiments of the present invention, the invention can be used to integrate with business to business applications. In several embodiments, the invention can be integrating with various Customer Relationship Management ("CRM") software tools or POS (Point of Sale) systems. In these embodiments, the user would be the business.

In several embodiments, the invention works in the following manner. A user can take a picture, or download from digital media. The user will then text the picture to a specified address along with an optional caption 5. In some embodiments, the user is then shown a preview of the card to be generated and is asked if they approve of the card content 45.

In several embodiments, when a user wants to sign up for a service they can sign up through a proprietary website, pick a service plan, enter a phone number and then enter a credit card. The system, or chatbot 15, will then save that information. In many embodiments, the chatbot 15 will then send the user a text, asking them to add recipients on this link if they haven't already. Once the user does that, and an activation code is sent to the bot, the user will then receive a numbered list of potential recipients 35. The user can then reply with a number selected to send materials to and/or the number of custom cards that the user wishes to send to multiple recipients 40.

Figure 2:
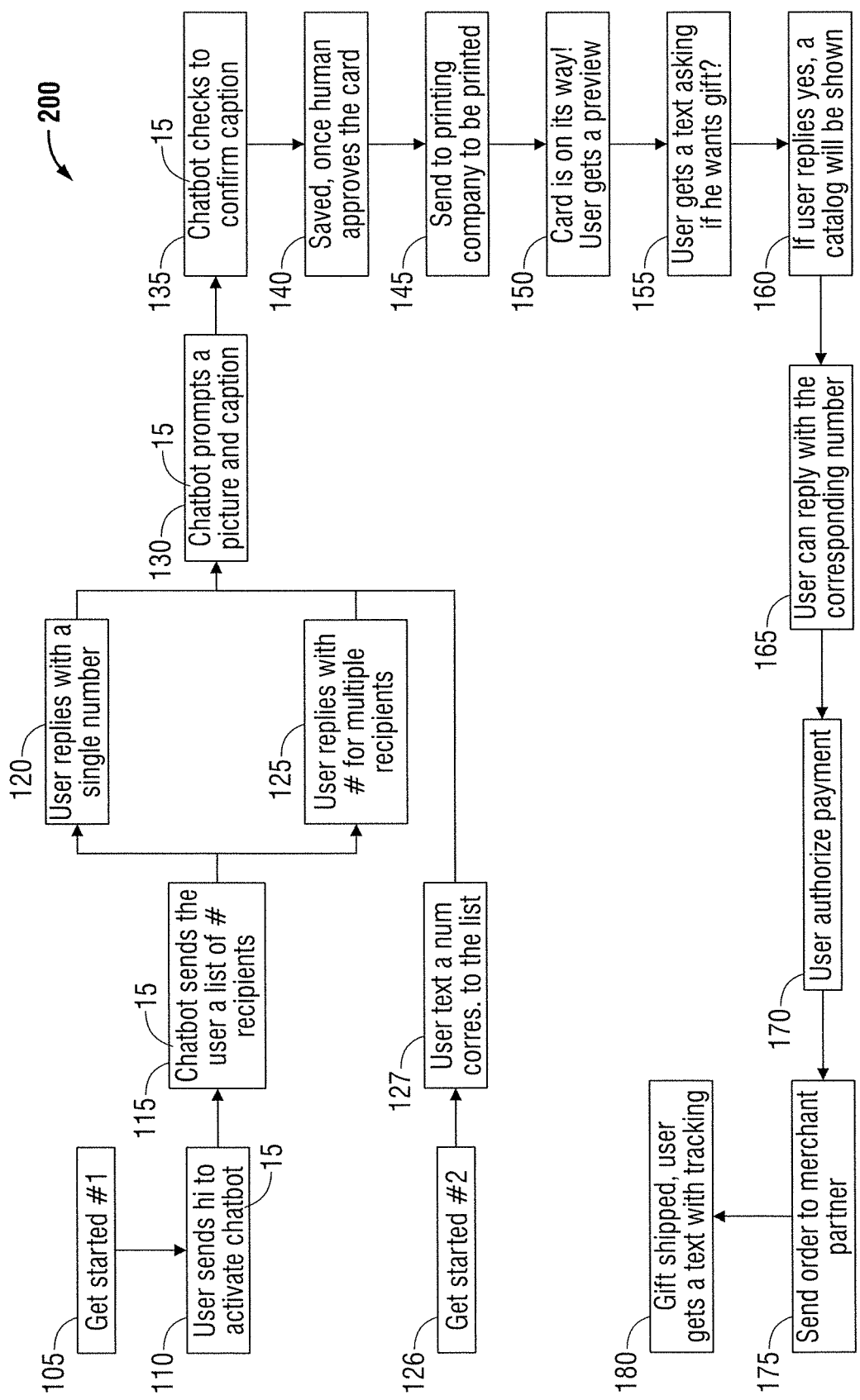
FIG. 2 is a flow chart showing the process of one embodiment of the present invention.

FIG. 2 is a flow chart of one embodiment of the present invention. As shown, FIG. 2 is one embodiment of the present invention for a user to actuate the process of the present invention 200. As shown, in several embodiments, a user can get started 105 and send a "hello" or other activation signal to activate 110 the chatbot 15. In several embodiments, the chatbot will send to the user a list of a number of potential recipients 115. In several embodiments, the user can reply with a single number 120 or, in several embodiments, the user can reply with multiple recipient numbers 125. In several embodiments, the chatbot 15 can then prompt a picture and caption 130.

FIG. 2 also demonstrates an alternate flow path in which a user can get started 126, and the user then texts a number corresponding to the recipients' list 127 to the chatbot 15. It is at this point that the chatbot can then prompt a picture and caption 130. User can skip the recipients list text if the user knows the recipient's number by heart. For example, if Dad is 1, Mom is 2, Sister is 3, if user wants to send a card to mom, the user can start by texting 3, chatbot will then prompt a picture and caption. If the user would like to send to all 3 recipients, he can just text 1 2 3 to the chatbot and the chatbot will then prompt a picture and caption for all 3 recipients.

In several embodiments, if the user chooses to send to one recipient only, then the user can send one number back based on the recipient list that the chatbot 15 texted earlier. In some embodiments, if the user chooses multiple recipients, he will then send the numbers, for example, "1, 2, 3" if the user wants to send it to the top 3 recipients on his list. In some embodiments, the user will be directed to send a picture, and then a caption that is no more than three hundred words. After that, once a custodian, or computer program approves their card, it will be printed and shipped. The user will then get to see a downloadable link to see what their postcard looks like 85 (FIG. 1).

In several embodiments, once the chatbot 15 prompts a picture and caption 130 the chatbot 15 then checks to confirm the caption 135 with the user by sending a copy for the user. If the user approves the card electronically, then it is saved in the chatbot memory 140 or on a backend database 10 (FIG. 1). In several embodiments, once the card information is saved and approved, it is sent to printing to be printed 145. In several embodiments, the card is mailed to the end recipient, and the user will be shown an electronic copy of the final card 150.

In some embodiments, after the card is sent 150 the user will get a text from the chatbot 15 inquiring if the user would like to send a gift with the card 155. In some embodiments, if a user responds "yes" then a catalog will be electronically sent or shown to the user 160. In some embodiments, a user can then respond to the chatbot 15 with a corresponding item that the user wishes to purchase 165. In several embodiments, once the user authorizes payment 170, the order is sent to a merchant partner 175, and the gift is shipped with a tracking number 180.

In some embodiments, chatbot 15 asks a user if the user wants to send a gift. In certain embodiments, the chatbot 15 can send the gift contemporaneously with the postcard 22. In some embodiments, the chatbot 15 can send a confirmation text to the user asking if the gift selection is acceptable. In some embodiments the application 56 assembles an electronic package 61 consisting of a picture caption, address, and gift order. In some embodiments, the application 56 can send the e-package 61 to a merchant printing entity 72 to print the postcard 22 along with a gift. In some embodiments, there are multiple merchants 175 for multiple gifts or postcards 22 to be sent.

In some embodiments, the user can text a picture to a chatbot 15 number. Then the chatbot 15 will prompt the user to send a caption. Then the chatbot 15 will say the card is ready to be sent, but the user needs to create an account first. The chatbot 15 will ask for all the information required to create an account and create it on behalf of the user. The user will then authorize payment for either the monthly plan or sending it one time 13, 14 (FIG. 1).

In some embodiments, the card gets sent and the user gets a link to view the postcard 45 (FIG. 1). In some embodiments, right after the user gets a text to view their card and it is ready to be printed and shipped, the user gets another text asking them if they would like to include a gift for that same recipient 155. If the user says "yes", then there would be a link for the user to browse our catalog, or better yet, a catalog with numbered items sent to the user via text, and the user can reply with the item number that the user would like to purchase and include with the card 160. In some embodiments, the user would authorize payment, and the gift will be on its way 170, 175, 180.

Figure 3:
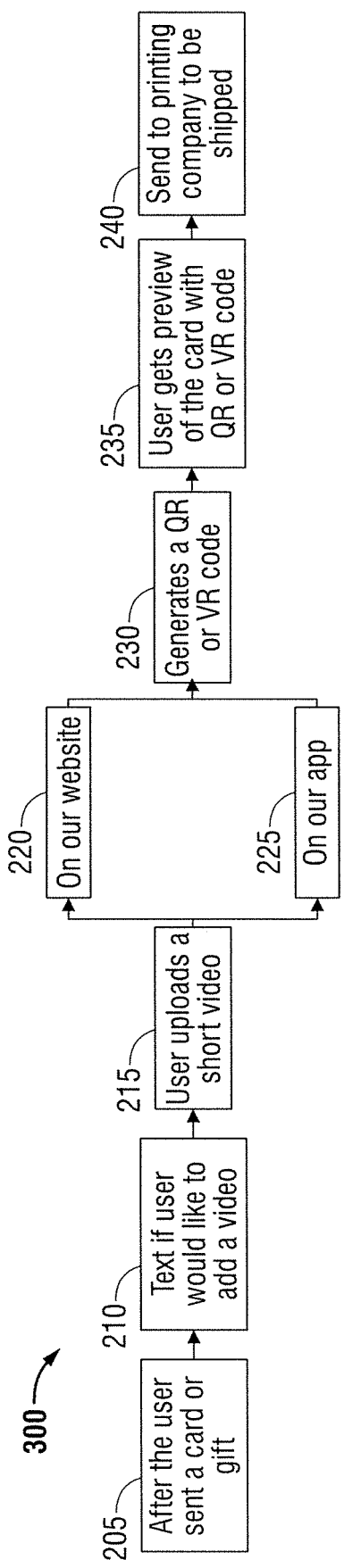
FIG. 3 is a flow chart showing the process of one embodiment of the present invention.

In some embodiments, the invention incorporates gifts and gift cards with postcards (FIGS. 2 and 3). In some embodiments, the present invention uses VR codes so that a user can use VR headsets to see a video or song pop up 230, 235 (FIG. 3) In some embodiments, the present invention can utilize business to business interfaces, in which the business is the user.

FIG. 3 illustrates one embodiment of the invention in which a video can be generated with a postcard 300. As shown, in one embodiment, after a user is sent a card or a gift 205 the user may receive a text asking if they would like to add a video 210. In some embodiments, the user can then upload a short video 215 to either the proprietary website 220 or to the proprietary application 225. In several embodiments, the next step is to generate a QR or VR code 230. In many embodiments, the user can then preview the card with the QR or VR code 235, and if it meets with user approval, the information is sent to the printer to be shipped 240.

Figure 4:
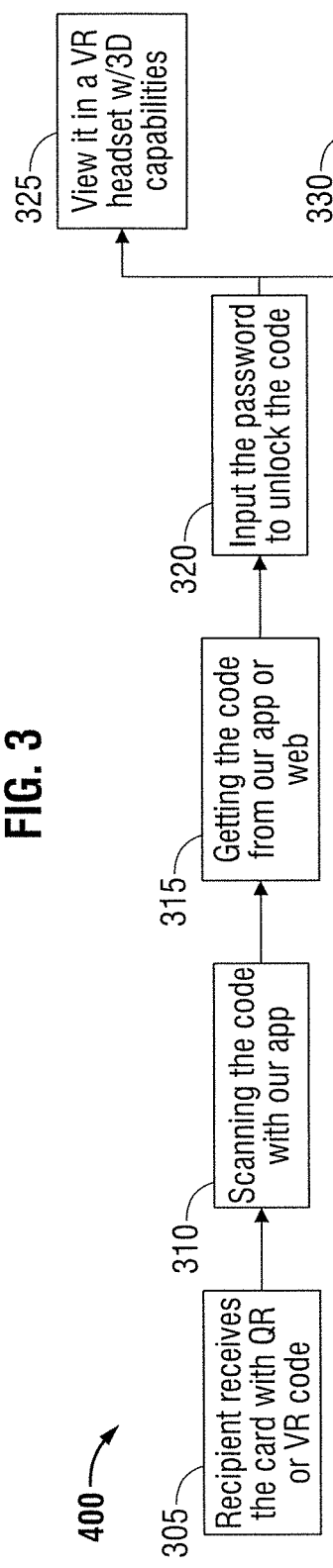
FIG. 4 is a flow chart showing the process of one embodiment of the present invention.

FIG. 4 illustrates one embodiment of the present invention after the recipient has received a card with a QR code 305. The user can then scan the code with the proprietary application 310. The code will be retrieved from the application or website 315. The recipient can then input the password to unlock the code 320. In several embodiments, the recipient can then either view the video in a virtual reality headset 325 or view the video on the proprietary application 330. In several embodiments, the virtual reality headset can be any virtual reality, or standard viewing or listening platform.

Figure 5:
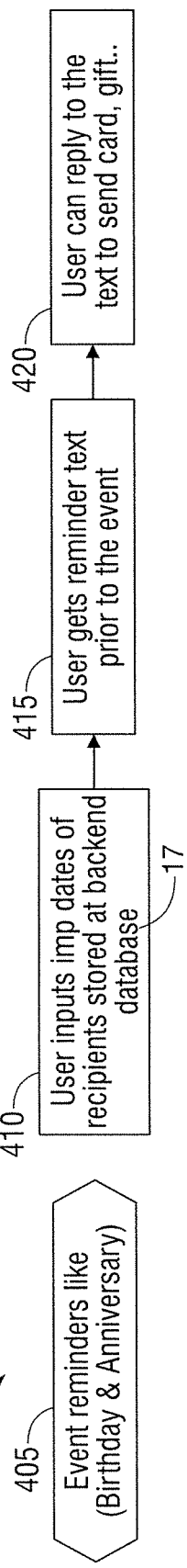
FIG. 5 is a flow chart showing the process of one embodiment of the present invention.

FIG. 5 illustrates one embodiment of the present invention 500 in a flowchart as it applies to event reminders 405. As shown, event reminders 405 can be inputted including important dates and recipients 410, and these materials are stored in the backend database 17. In some embodiments, a user will get reminder texts prior to an event 415. In some embodiments, a user can then be prompted to send a card or gift as reminded by a text 420 from the chatbot 15.

In several embodiments, the present invention is a system for creating postcards through use of electronic media as shown in FIGS. 1-5. A system for creating postcards through use of electronic media comprising: a chatbot 15 with printing creation and generation capability that can receive, process, and send data; an electronic transmission device 3 that can send, receive, and process data from a chatbot 15; a backend database 17; and a web application, weblink or website 2; wherein electronic input from said electronic transmission device 3 is sent to said web application, web link or website 2 and stored in said backend database 17; said backend database 17 will transmit an activation code to said chatbot 15; said chatbot 15 will electronically communicate with said electronic transmission device 3 and obtain printing generation instructions from said electronic transmission device 3; said chatbot 15 will process said printing generation instructions from said electronic transmission device 3; said chatbot 15 will generate a postcard 22 from said printing generation instructions from said electronic transmission device 3.

In some embodiments, said electronic input from said electronic transmission device 3 is sent to said web application or website includes numbers, pictures, and/or a message 16.

In some embodiments of the present invention there is a printer or printing entity 80 in which the chatbot 15 sends electronic instruction generate a postcard 22 to a review panel 65, and said review panel sends instructions to a printer and a postcard is physically generated 70.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Accordingly, it is intended that the following claims be interpreted to embrace all such variations and modification.

The invention claimed is:

1. A system for creating and mailing postcards through use of electronic media comprising:
    a chatbot with printing creation and generation capability that can receive, process, and send data;
    an electronic transmission device that can send, receive, and process data from a chatbot;
    a backend database; and
    a web application or website; wherein
    electronic input from said electronic transmission device is sent to said web application or website and stored in said backend database;
    said backend database will transmit an activation code to said chatbot;
    said chatbot will electronically communicate with said electronic transmission device and obtain printing generation instructions from said electronic transmission device;
    said chatbot will process said printing generation instructions from said electronic transmission device;
    said chatbot will generate a postcard from said printing generation instructions from said electronic transmission device;
    said chatbot generates multiple postcards based on postcard recipient content stored in said backend database;
    said chatbot generates a QR or VR code for a postcard recipient to upload to view a video;
    said QR or VR code is scanned by a user with said QR or VR code being retrieved from said website and said user unlocks said QR or VR code through the input of a password; and
    user then views said video on a virtual reality headset or a proprietary application.

2. The system for creating and mailing postcards through use of electronic media of claim 1 further comprising:
    said electronic input from said electronic transmission device is sent to said web application, weblink or website includes numbers, pictures, and/or a message.

3. The system for creating and mailing postcards through use of electronic media of claim 1 further comprising:
    a printer;
    said chatbot sends electronic instruction to generate a postcard to a review panel, and said review panel sends instructions to a printer and a postcard is physically generated.

4. The system for creating and mailing postcards through use of electronic media of claim 3 further comprising:
    said chatbot sends an electronic copy of the postcard to be generated to said electronic transmission device for preview by a user before said postcard is physically generated.

5. The system for creating and mailing postcards through use of electronic media of claim 1 further comprising:
    said chatbot can instruct a third party vendor to send a gift and/or gift card to a postcard recipient.

6. The system for creating and mailing postcards through use of electronic media of claim 1 further comprising:
    said backend database can store event reminder materials.

7. A method for creating and mailing postcards through use of electronic media comprising the steps of:
    obtaining a chatbot with printing creation and generation capability that can receive, process, and send data;
    obtaining an electronic transmission device that can send, receive, and process data from a chatbot;
    obtaining a backend database; and obtaining a web application, weblink or website; wherein
    sending electronic input from said electronic transmission device is to said web application, weblink or website and is stored in said backend database;
    transmitting an activation code to said chatbot from said backend database;
    obtaining printing generation instructions from said electronic transmission device through which said chatbot will electronically communicate with said electronic transmission device; and
    processing said printing generation instructions in said chatbot sent from said electronic transmission device;
    generating a postcard from said printing generation instructions in said chatbot from said electronic transmission device;
    receiving and storing digital content of a user including payment plans, postcard recipients, video, credit card information, messages, addresses and/or pictures in said backend database;
    generating a QR or VR code for a postcard recipient to upload to view a video via said chatbot;
    said chatbot generates a QR or VR code for a postcard recipient to upload to view a video;
    said QR or VR code is scanned by a user with said QR or VR code being retrieved from said website and said user unlocks said QR or VR code through the input of a password; and
    user then views said video on a virtual reality headset or a proprietary application.

8. The method for creating and mailing postcards through use of electronic media of claim 7 further comprising the step of:
    sending to said web application or website information which includes numbers, pictures, and/or a message said electronic input from said electronic transmission device.

9. The method for creating and mailing postcards through use of electronic media of claim 8 further comprising step of:

obtaining a printer;
sending via said chatbot, electronic instruction to generate a postcard to a review panel and then to said printer and a postcard is physically generated.

10. The method for creating and mailing postcards through use of electronic media of claim 9 further comprising the step of:
sending via said chatbot an electronic copy of the postcard to be generated to said electronic transmission device for preview by a user before said postcard is physically generated.

11. The method for creating and mailing postcards through use of electronic media of claim 7 further comprising the step of:
generating multiple postcards based on postcard recipient content stored in said backend database through said chatbot.

12. The method for creating and mailing postcards through use of electronic media of claim 7 further comprising the step of:
instructing a third party vendor to send a gift and/or gift card to a postcard recipient via said chatbot.

13. The method for creating and mailing postcards through use of electronic media of claim 7 further comprising the step of;
storing event reminder materials in said backend database.

14. A system for creating and mailing printable materials through use of electronic media comprising:
a chatbot with printing creation and generation capability that can receive, process, and send data;
an electronic transmission device that can send, receive, and process data from a chatbot;
a backend database; and
a web application or website; wherein
electronic input from said electronic transmission device is sent to said web application or website and stored in said backend data base;
said backend database will transmit an activation code to said chatbot;
said chatbot will electronically communicate with said electronic transmission device and obtain printing generation instructions from said electronic transmission device;
said chatbot will process said printing generation instructions from said electronic transmission device; said chatbot will generate a postcard from said printing generation instructions from said electronic transmission device;
receiving and storing digital content of a user including payment plans, postcard recipients, video, credit card information, messages, addresses and/or pictures in said backend database;
generating a QR or VR code for a postcard recipient to upload to view a video via said chatbot;
said chatbot generates a QR or VR code for a postcard recipient to upload to view a video;
said QR or VR code is scanned by a user with said QR or VR code being retrieved from said website and said user unlocks said QR or VR code through the input of a password; and
user then views said video on a virtual reality headset or a proprietary application.

15. The system for creating and mailing printable materials through use of electronic media of claim 14 further comprising:
a printer;
said chatbot sends electronic instruction to generate a postcard to a review panel, and said review panel sends instructions to a printer and a postcard is physically generated.

16. The system for creating and mailing printable materials through use of electronic media of claim 15 further comprising:
said chatbot sends an electronic copy of the postcard to be generated to said electronic transmission device for preview by a user before said postcard is physically generated.

17. The system for creating and mailing printable materials through use of electronic media of claim 14 further comprising:
said backend database will transmit an SMS to a user as a reminder of an event prior to any calendared event in said backend database.

18. The system for creating and mailing postcards through use of electronic media of claim 1 further comprising:
said backend database will transmit SMS to a user as a reminder of an event prior to any calendared event in said backend database.

* * * * *